(12) United States Patent
Hermann et al.

(10) Patent No.: US 10,616,855 B2
(45) Date of Patent: Apr. 7, 2020

(54) METHOD AND APPARATUS FOR LOCATING A MOBILE TERMINAL

(71) Applicant: CONTINENTAL AUTOMOTIVE GMBH, Hannover (DE)

(72) Inventors: Stefan Hermann, Neunkirchen am Brand (DE); Michael Schmeisser, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/329,886

(22) PCT Filed: Aug. 28, 2017

(86) PCT No.: PCT/EP2017/071494
§ 371 (c)(1),
(2) Date: Mar. 1, 2019

(87) PCT Pub. No.: WO2018/041753
PCT Pub. Date: Mar. 8, 2018

(65) Prior Publication Data
US 2019/0253997 A1    Aug. 15, 2019

(30) Foreign Application Priority Data

Sep. 1, 2016  (DE) .................. 10 2016 216 562

(51) Int. Cl.
*H04W 24/00*  (2009.01)
*H04W 64/00*  (2009.01)
(Continued)

(52) U.S. Cl.
CPC ............... *H04W 64/00* (2013.01); *G01S 1/08* (2013.01); *G01S 5/00* (2013.01); *G01S 5/14* (2013.01);
(Continued)

(58) Field of Classification Search
CPC ..... H04W 64/00; H04W 88/02; H04W 8/245; H04W 24/02; H04M 1/72519; H04M 1/72522; G07C 9/0007
(Continued)

(56) References Cited

U.S. PATENT DOCUMENTS 7,388,466 B2 * 6/2008 Ghabra .................. E05B 81/78
307/10.5
2006/0194587 A1   8/2006 Sharony et al.
(Continued)

FOREIGN PATENT DOCUMENTS

DE       102007042019 A1    4/2009
DE       102009021783 A1    9/2010
(Continued)

*Primary Examiner* — Danh C Le
(74) *Attorney, Agent, or Firm* — Laurence A. Stemer; Ralph E. Locher; Werner H. Stemer

(57) ABSTRACT

An apparatus and a method for locating a mobile terminal, in particular a mobile radio terminal for a cellular mobile radio network by way of an apparatus of a motor vehicle. The mobile terminal sets up a connection to at least one first receiver, while the mobile terminal does not set up a connection to the at least one further one of the receivers at least for this locating operation. Both the at least one first receiver and at least one of the further ones of the receivers each determine a field strength of at least one radio signal transmitted by the mobile terminal or a first receiver. The field strengths thus determined are used to locate to locate the mobile terminal.

22 Claims, 4 Drawing Sheets

(51) Int. Cl.
  *G01S 5/00* (2006.01)
  *G01S 1/08* (2006.01)
  *G01S 13/74* (2006.01)
  *G01S 5/14* (2006.01)
  *H04M 1/725* (2006.01)

(52) U.S. Cl.
  CPC ......... *G01S 13/74* (2013.01); *H04M 1/72519* (2013.01); *H04M 1/72522* (2013.01)

(58) Field of Classification Search
  USPC .................................. 455/456.1, 550.1, 418
  See application file for complete search history.

(56) References Cited

U.S. PATENT DOCUMENTS

| | | | |
|---|---|---|---|
| 2008/0261623 A1 | 10/2008 | Etemad et al. | |
| 2011/0105097 A1* | 5/2011 | Tadayon | H04W 4/50 455/418 |
| 2011/0195699 A1* | 8/2011 | Tadayon | H04B 5/0062 455/418 |
| 2012/0025634 A1* | 2/2012 | Dajaku | H02K 3/20 310/12.21 |
| 2014/0188309 A1 | 7/2014 | Caratto et al. | |
| 2014/0195125 A1 | 7/2014 | Siegel et al. | |
| 2015/0235486 A1* | 8/2015 | Ellis | G07C 9/00309 340/5.61 |
| 2016/0063860 A1* | 3/2016 | Lickfelt | G08G 1/123 340/988 |
| 2016/0248905 A1 | 8/2016 | Miller et al. | |
| 2016/0320469 A1* | 11/2016 | Laifenfeld | G01S 5/0284 |
| 2017/0149946 A1* | 5/2017 | Buttolo | H04M 1/6091 |
| 2017/0228952 A1* | 8/2017 | Ellis | G07C 9/00309 |
| 2018/0082588 A1* | 3/2018 | Hoffman, Jr. | G08G 1/166 |

FOREIGN PATENT DOCUMENTS

| | | |
|---|---|---|
| DE | 102011112370 A1 | 3/2013 |
| DE | 102013019904 A1 | 5/2015 |
| DE | 112015000342 T5 | 10/2016 |
| EP | 2205031 A2 | 7/2010 |
| EP | 2958349 A1 | 12/2015 |

* cited by examiner

METHOD AND APPARATUS FOR LOCATING A MOBILE TERMINAL

BACKGROUND OF THE INVENTION

Field of the Invention

Method and apparatus for locating a mobile terminal, in particular in the form of a mobile radio terminal for an, in particular, cellular mobile radio network, using an apparatus of a motor vehicle The invention relates to a method and an apparatus for locating a mobile terminal.

One object of the invention is to optimize a process of locating a mobile terminal, in particular for cellular mobile radio, in particular of a motor vehicle. The object is respectively achieved by the subjects of the independent patent claims. Some particularly advantageous configurations of the invention are specified in the subclaims and the description. As alternatives to existing solutions, configurations of the invention may enable efficient localization and/or localization which is not susceptible to errors.

SUMMARY OF THE INVENTION

With respect to some configurations of the invention according to the subclaims:

According to configurations of the invention, localization (of a terminal location), in particular using receivers can be carried out by measuring field strengths of a WLAN signal or Bluetooth signal using a plurality of receivers of a motor vehicle (for example in and/or outside the latter).

According to configurations of the invention, for example, some receivers may be receive-only receivers (that is to say receivers without transmitters) and/or cannot set up a (bidirectional) connection to the mobile terminal.

According to configurations of the invention, for example, some further receivers may either receive connection parameters, in particular at least one key, of a connection between a first receiver and the mobile terminal from the first receiver (for example via a common controller/ECU (or an ECU connected to each receiver and a bus in between)) or may receive or generate them by eavesdropping, for example when setting up the connection between a first receiver (that is to say a master, for example) and the mobile terminal (in particular if the first and further receivers (that is to say slaves, for example) know the same secrets and/or connection parameters, for example Bluetooth connection codes, WLAN connection codes, frequencies, SSID etc.) or may have stored them (for example a key and/or connection parameters after pairing, in particular by Bluetooth or WLAN).

Further features and advantages of some advantageous configurations of the invention will emerge from the following description of some exemplary embodiments of the invention with reference to the drawing.

BRIEF DESCRIPTION OF THE SEVERAL VIEWS OF THE DRAWING

In this case, to illustrate some possible configurations of the invention, in a schematically simplifying manner.

DESCRIPTION OF THE INVENTION

Figure 1:
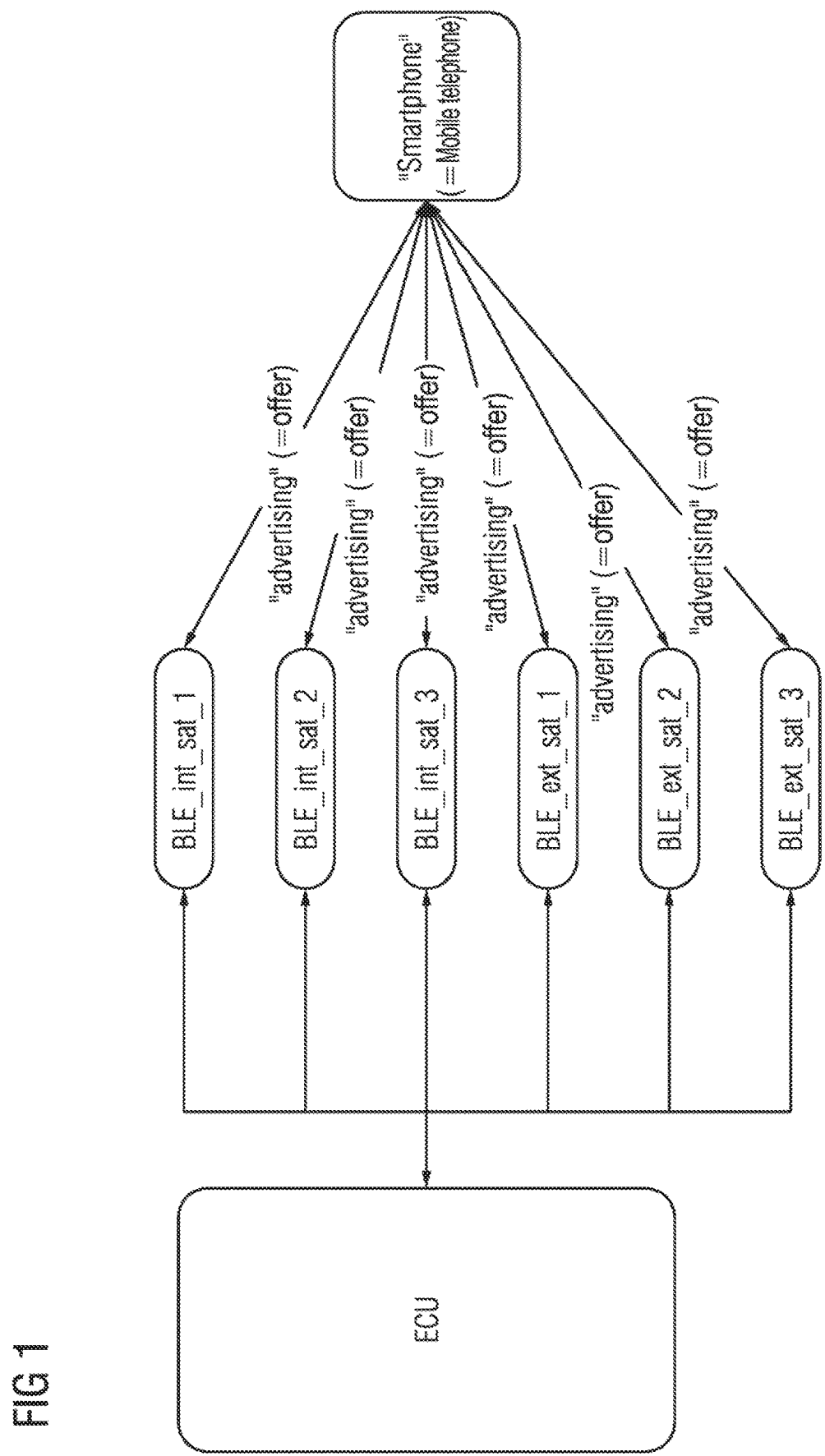
FIG. 1 shows an at least internally known Bluetooth variant of a smartphone having a plurality of Bluetooth transceivers each via Bluetooth (in an advertising mode etc.)
Figure 2:
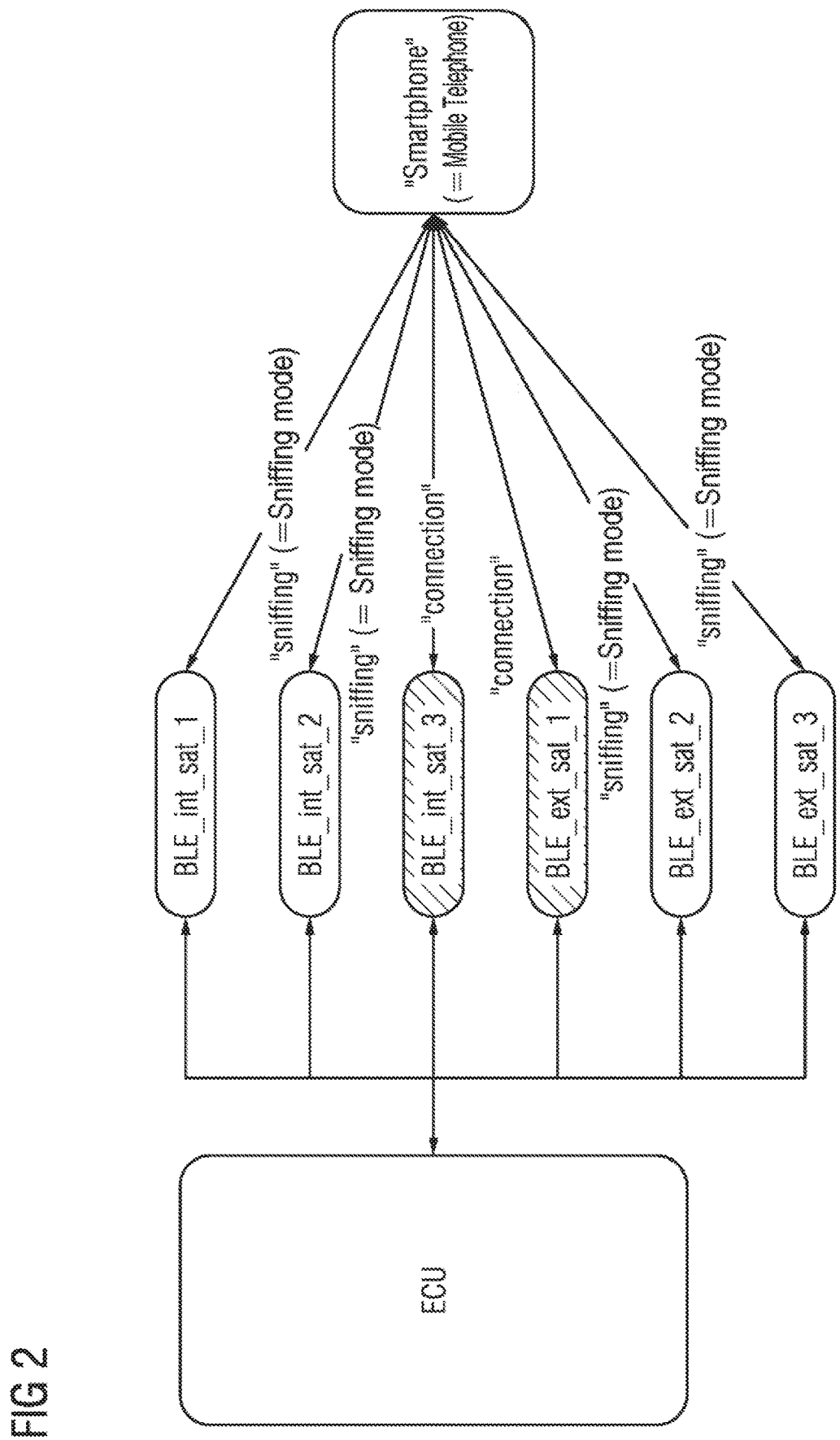
FIG. 2 shows an at least internally known Bluetooth variant of a smartphone having a plurality of Bluetooth transceivers each via Bluetooth (in a connection/sniffing mode etc.)
Figure 3:
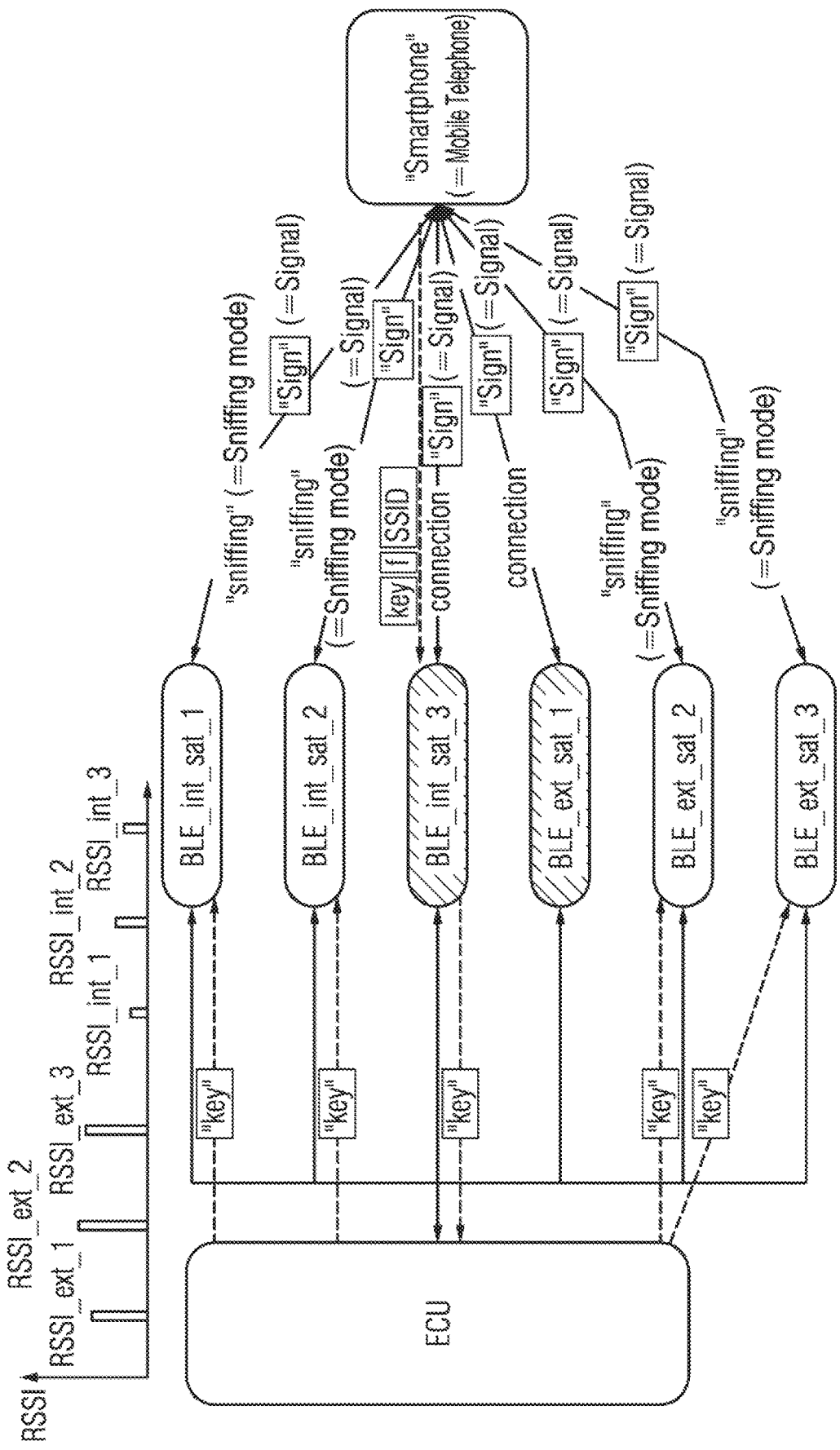
FIG. 3 shows, at the bottom, a (for example Bluetooth or WLAN) connection between a smartphone and at least one transceiver via a (useful data) connection (in a connection mode etc.), wherein a plurality of (for example receive-only) receivers also determine the (RSSI/field) strength of at least one radio signal of this connection by eavesdropping, and shows, at the top, field strengths of a respective signal which are respectively determined by the receivers.

FIG. 3 shows, by way of example, one configuration of the invention for locating (determining the position of) a mobile terminal Smrt (for example a mobile radio terminal for an, in particular, cellular mobile radio network), by means of receivers BLE_ext_sat_1, BLE_ext_sat_2, BLE_ext_sat_3, BLE_int_sat_1, BLE_int_sat_2, BLE_int_sat_3 and an evaluation device (for example connected to a bus CAN) and/or a controller ECU of a motor vehicle Kfz, wherein the localization (positioning, x,y,z/RSSI_ext_1 . . . RSSI_int_3) can be used, for example, for a vehicle access and/or start system etc. or another service, for example in order to only open and/or start the motor vehicle Kfz if a maximum distance (d1; d2; d3, average value or maximum thereof etc.) to the motor vehicle Kfz or else a position in the motor vehicle is determined on account of the localization.

The mobile terminal Smrt sets up a (for example useful data interchange) connection (connection) to at least one (two in FIG. 3, namely BLE_int_sat_3 and BLE_ext_sat_1), but fewer than all, first (BLE_ext_sat_1, BLE_int_sat_3) of the receivers (BLE_ext_sat_1, BLE_ext_sat_2, BLE_ext_sat_3, BLE_int_sat_1, BLE_int_sat_2, BLE_int_sat_3) inside and/or outside the motor vehicle Kfz (for example by interchanging or generating on both sides at least one key and/or connection parameters f, SSID etc.).

The mobile terminal Smrt does not set up any such (useful data interchange) connection to further ones (BLE_ext_sat_2, BLE_ext_sat_3, BLE_int_sat_1, BLE_int_sat_2) of the receivers;

these receivers only each measure (by receiving/listening; hold, sniff, park, advertise etc.) a field strength (RSSI_ext_1, RSSI_ext_2, RSSI_ext_3, RSSI_int_1, RSSI_int_2, RSSI_int_3) of at least one radio signal Sign transmitted by the mobile terminal Smrt (to/for a first receiver, for example in an encrypted manner, and/or with a frequency f and/or with connection parameters such as SSID etc. in the signal).

Both the at least one first (BLE_ext_sat_1, BLE_int_sat_3) of the receivers and the further ones (BLE_ext_sat_2, BLE_ext_sat_3, BLE_int_sat_1, BLE_int_sat_2) of the receivers therefore each measure a field strength (RSSI_ext_1, RSSI_ext_2, RSSI_ext_3, RSSI_int_1, RSSI_int_2, RSSI_int_3) of at least one radio signal Sign transmitted by the mobile terminal Smrt, for example the same signal Sign.

The connection between the mobile terminal and the at least one first (BLE_ext_sat_1, BLE_int_sat_3) receiver may be, for example, a Bluetooth connection or a WLAN connection (for example IEEE 802.11).

The further ones (BLE_ext_sat_2, BLE_ext_sat_3, BLE_int_sat_1, BLE_int_sat_2) of the receivers may be, for example, receive-only receivers and/or receivers without a transmitting device or may alternatively have a transmitting device but may not use it for localization and/or may not connect it to the terminal during localization etc.

The one (or more) first (BLE_ext_sat_1, BLE_int_sat_3) receivers can also have a transmitter and/or may be a transceiver, for example.

According to configurations of the invention, for example, some further receivers may receive connection parameters, in particular at least one key, of a connection between a first receiver and the mobile terminal, for example from the first receiver, for example, in particular via a common controller and/or an ECU and/or a bus, or may receive or generate them by eavesdropping, for example when setting up the connection between a first receiver and the mobile terminal (in particular if the first and further receivers know the same secrets and/or connection parameters, for example Bluetooth connection codes, key generation codes, WLAN connection codes, frequencies, receiver SSID, SSID of the first receiver etc.).

The further ones (BLE_ext_sat_2, BLE_ext_sat_3, BLE_int_sat_1, BLE_int_sat_2) of the receivers may each determine a field strength (RSSI_ext_1, RSSI_ext_2, RSSI_int_1, RSSI_int_2) of at least one radio signal Sign which is transmitted by the mobile terminal Smrt (or by the first receiver (to/for the terminal)) and is identified by said receivers as having been transmitted by the mobile terminal Smrt or by the first receiver (to/for the terminal) using, for example, at least one key and/or (further) connection parameters, (wherein, for example, the key and/or (further) connection parameters was/were agreed when setting up a connection (reference sign connection) between the mobile terminal Smrt and the at least one first receiver (BLE_ext_sat_1, BLE_int_sat_3).

The further ones (BLE_ext_sat_2, BLE_ext_sat_3, BLE_int_sat_1, BLE_int_sat_2) of the receivers can also each determine a field strength (RSSI_ext_1, RSSI_ext_2, RSSI_int_1, RSSI_int_2) of at least one radio signal Sign which is transmitted by the mobile terminal Smrt (or by the first receiver (to/for the terminal)) and is identified by said receivers as having been transmitted by the mobile terminal (Smrt) (or by the first receiver (to/for the terminal)) using a key (key) which is agreed while or after setting up a connection between the mobile terminal Smrt and the at least one first receiver (BLE_ext_sat_1, BLE_int_sat_3)

and/or which (key and/or connection parameters f, SSID etc.) is received by the further receivers (BLE_ext_sat_2, BLE_ext_sat_3, BLE_int_sat_1, BLE_int_sat_2), for example from a control unit ECU (in particular a bus control unit connected to a bus CAN of a motor vehicle Kfz) which received said key/parameters from the first receiver (BLE_ext_sat_1, BLE_int_sat_3), for example.

In FIG. 3, for example, the (first) receiver BLE_ext_sat_1 determines (for example measures) a field strength RSSI_ext_1 of a radio signal Sign transmitted by the mobile terminal (Smrt), the (first) receiver BLE_int_sat_3 determines (for example measures) a field strength RSSI_int_3 of a radio signal Sign transmitted by the mobile terminal (Smrt), the further one BLE_ext_sat_2 of the receivers determines (for example measures) a field strength RSSI_ext_2 of at least one radio signal Sign transmitted by the mobile terminal (Smrt), the further one BLE_ext_sat_3 of the receivers determines (for example measures) a field strength RSSI_ext_3 of at least one radio signal Sign transmitted by the mobile terminal (Smrt), the further one BLE_int_sat_1 of the receivers determines (for example measures) a field strength RSSI_int_1 of at least one radio signal Sign transmitted by the mobile terminal (Smrt), the further one BLE_int_sat_2 of the receivers determines (for example measures) a field strength RSSI_int_2 of at least one radio signal Sign transmitted by the mobile terminal (Smrt).

Field strengths, for example of the same signal, are captured in a parallel manner and/or at the same time, for example.

The connection which has been set up is bidirectional, in particular, with the possibility of transmitting via the connection in both directions.

For example, all receivers can measure the field strengths of the same signal Sign, for example by means of clocking by a controller ECU and/or by measuring, for example, a first signal etc. in a particular frame etc.

If the further receivers measure the strength of a signal transmitted by a first receiver, the first receiver, for example, can measure the strength of a signal transmitted by the mobile terminal (and this can be concomitantly used for localization), or the localization is carried out, for example, only on the basis of (field) strengths of a signal (for example of the same signal) transmitted by a first receiver which are measured by a plurality of further receivers.

A controller ECU can use the field strengths (RSSI_ext_1, RSSI_ext_2, RSSI_ext_3, RSSI_int_1, RSSI_int_2, RSSI_int_3) measured by the receivers (and possibly communicated to the controller ECU) or values calculated therefrom to determine, for example, a position (x, y, z) of the mobile terminal (Smrt), for example by means of triangulation (for example from three distances d1, d2, d3 determined from strengths of at least one signal Sign) and/or averaging and/or knowledge of the positions of the receivers. The position determination/localization could also be carried out only to determine whether the terminal Smrt is in the motor vehicle Kfz or whether it is closer to the latter than a specification, for example on the basis of the position and/or strength(s) of the at least one signal.

Figure 4:
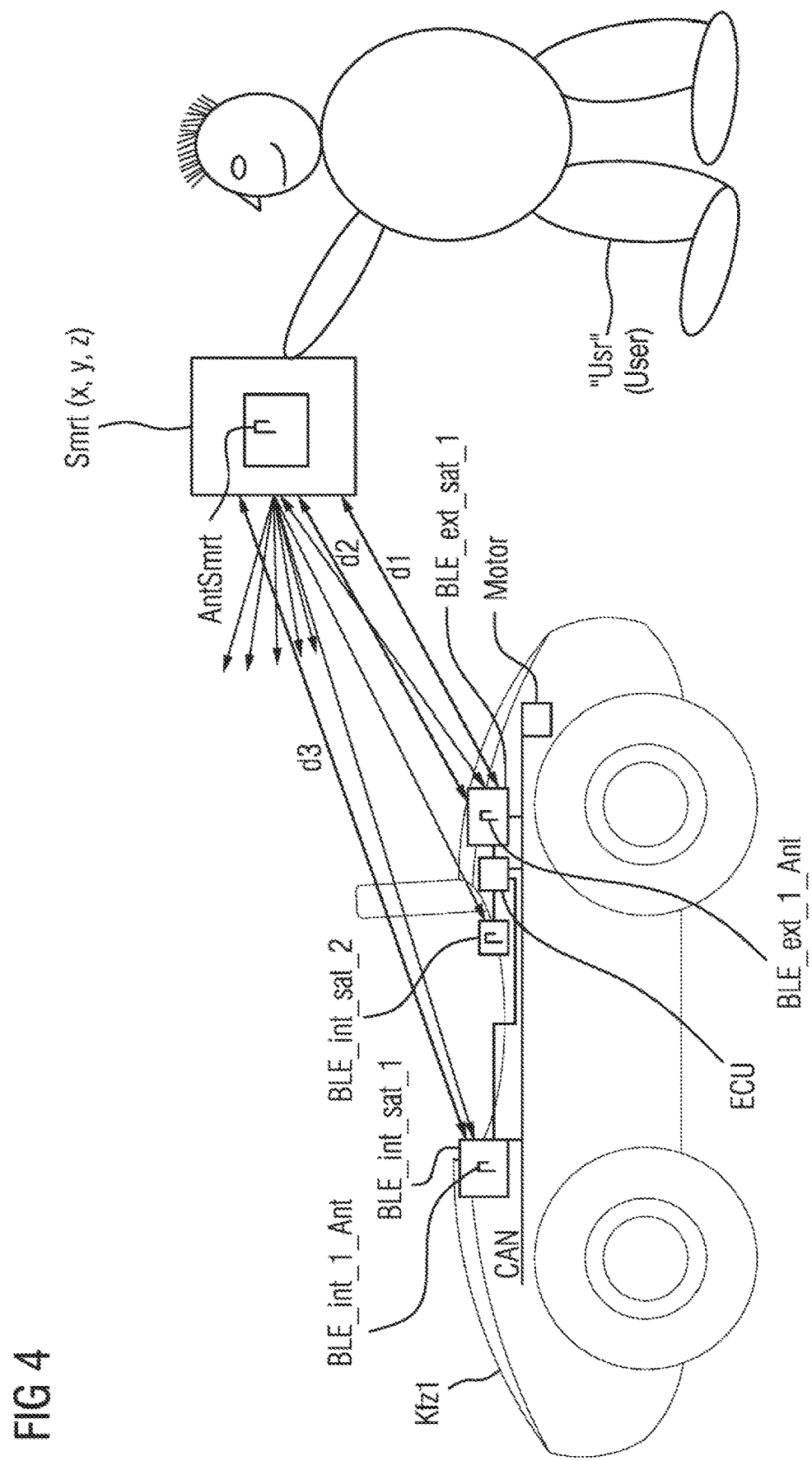
FIG. 4 shows a mobile terminal which transmits at least one signal, via a (for example Bluetooth or WLAN) connection, to a first (for example connected) receiver (for example in an encrypted manner) or receives said signal from the latter, while further receivers determine the strength of this signal by listening.

FIG. 4 shows, by way of example, a user Usr and a mobile terminal Smrt (with a transmitter and a receiver indicated by an antenna AntSmrt) and receivers BLE_ext_sat_1, BLE_ext_sat_2, BLE_ext_sat_3, BLE_int_sat_1, BLE_int_sat_2, BLE_int_sat_3 of a motor vehicle Kfz (here inside and outside the latter) which are connected to one another by means of a (bus) control unit ECU (and/or via a bus CAN), each determine a field strength (RSSI_ext_1, RSSI_ext_2, RSSI_ext_3, RSSI_int_1, RSSI_int_2, RSSI_int_3) of at least one radio signal Sign transmitted by the mobile terminal Smrt or by a first receiver and communicate this, for example, to an evaluation device ECU, for example, which therefore locates (for example determines the position x, y, z of) the mobile terminal Smrt.

The invention claimed is:

1. A method of locating a mobile terminal, the method comprising:

setting up with the mobile terminal a connection to at least one first receiver of a plurality of receivers, while not setting up a connection with a further one of the plurality of receivers, at least for the given locating operation;

determining with each of the at least one first receiver and at least one of the further receivers a field strength of at least one radio signal transmitted by the mobile terminal or a first receiver;

locating the mobile terminal by way of the field strengths thus determined;

determining with each of the further ones of the receivers a field strength of at least one radio signal which is transmitted by the mobile terminal or a first receiver and is identified by the receivers as having been transmitted by the mobile terminal or a first receiver using a key and/or connection parameters; and wherein the key or connection parameters is/are agreed when or after setting up a connection between the mobile terminal and the at least one first receiver and is/are received by the further receivers from a control unit, which received said key/parameters from the first receiver.

2. The method according to claim 1, wherein:

the at least one further receiver determines a field strength of at least one radio signal that is transmitted by the mobile terminal or a first receiver and is identified by the receivers as having been transmitted by the mobile terminal or a first receiver using a key and/or connection parameters;

the key or connection parameters are agreed when setting up a connection between the mobile terminal and the at least one first receiver and are determined by the further receivers by receiving the key or connection parameters when setting up a connection of the first receiver of the plurality of receivers.

3. The method according to claim 1, which comprises:

determining with each of the further ones of the receivers a field strength of at least one radio signal which is transmitted by the mobile terminal or a first receiver and is identified by said receivers as having been transmitted by the mobile terminal or a first receiver using a key and/or connection parameters;

wherein the key or connection parameters is/are previously agreed between the mobile terminal and a first receiver.

4. The method according to claim 1, which comprises:

determining with both the at least one first of the receivers and each of the further ones of the receivers a field strength of at least one radio signal transmitted by the mobile terminal or a first receiver and communicating the field strength to a control device;

locating with the control device the mobile terminal by way of the determined field strengths.

5. The method according to claim 4, wherein the locating step comprises:

locating the mobile terminal by triangulation; and/or assuming a greater distance between the terminal and a receiver in comparison with another of the receivers, which other receiver measures a greater field strength than the first-mentioned of the receivers.

6. The method according to claim 1, wherein the field strength measured in a receiver is an RSSI field strength or another value representing the strength of the signal.

7. The method according to claim 1, wherein the step of setting up the connection with the mobile terminal to at least one first one of the receivers comprises setting up a Bluetooth connection or a WLAN connection by interchanging and/or generating at least one key and/or connection parameters.

8. The method according to claim 1, which comprises:

determining with each of the further ones of the receivers a field strength of at least one radio signal which is transmitted by the mobile terminal or a first receiver, thereby transmitting the signal, via a useful data connection, to at least one first one of the receivers or to the terminal using a connection (connection) which has been set up;

while the further ones of the receivers are in a connection advertising mode and/or a connection listening mode or only receive without transmitting;

and/or wherein some or all of the further ones of the receivers are receive-only receivers but are not transmitters.

9. The method according to claim 1, wherein:

at least some of the receivers are arranged in a motor vehicle; and wherein at least some of the receivers are arranged on the outside of a motor vehicle.

10. An apparatus for locating a terminal, the apparatus comprising:

a plurality of receivers of a motor vehicle each of said receivers being configured to determine a field strength of at least one radio signal that is transmitted by the mobile terminal or a first receiver;

at least one first and fewer than all of said receivers being configured to set up a connection to the mobile terminal;

both said at least one first of said receivers and one or more further said receivers being configured to determine a field strength of at least one radio signal transmitted by the mobile terminal or said first receiver; and said further receivers each determine a field strength of at least one radio signal transmitted by the mobile terminal or a first said receiver and identified by said receivers as having been transmitted by the mobile terminal or the first said receiver using a key;

which key is agreed when or after setting up a connection between the mobile terminal and said at least one first receiver and is received by said further receivers from a control unit, which received said key from said first receiver, or is received by said further receivers directly from said first receiver.

11. The apparatus according to claim 10, wherein:

said further receivers each determine a field strength of at least one radio signal which is transmitted by the mobile terminal and is identified by said receivers as having been transmitted by the mobile terminal or a first said receiver using a key and/or connection parameters;

which key or connection parameters is/are agreed when setting up a connection between the mobile terminal and said at least one first receiver and is/are used by said further receivers by receiving it/them when setting up a connection of said first receiver.

12. The apparatus according to claim 11, wherein the key is a key for a Bluetooth connection or a WLAN connection.

13. The apparatus according to claim 10, wherein:

said further receivers each determine a field strength of at least one radio signal which is transmitted by the mobile terminal or a first said receiver and is identified by said receivers as having been transmitted by the mobile terminal using a key;

which key is previously agreed between the mobile terminal and a first said receiver.

14. The apparatus according to claim 10, wherein:

both said at least one first receiver and said further receivers each determine a field strength of at least one radio signal transmitted by the mobile terminal or a first said receiver and communicate the thus determined field strengths to a control device which locates the mobile terminal by way of the determined field strengths.

15. The apparatus according to claim 14, wherein:

said control device is configured to locate the mobile terminal by one or both of the following:

by triangulation;

by assuming a greater distance between the terminal and a receiver in comparison with another of said receivers, which other receiver measures a greater field strength than the first-mentioned said receivers.

16. The apparatus according to claim 10, wherein the field strength measured in a respective said receiver is an RSSI field strength or a power or another value representing a field strength.

17. The apparatus according to claim 10, wherein the mobile terminal is configured to set up a Bluetooth connection or a WLAN connection to at least one first of said receivers.

18. The apparatus according to claim 10, wherein:

said further receivers each determine a field strength of at least one radio signal which is transmitted by the mobile terminal or a first said receiver, while said further receivers are in a connection advertising mode and/or a connection listening mode or only receive without transmitting;

and/or wherein some or all of said further receivers are receive-only receivers but are not transmitters.

19. The apparatus according to claim 10, wherein:

some of said receivers are arranged in a motor vehicle; and some of said receivers are arranged on an outside of a motor vehicle.

20. The apparatus according to claim 10, wherein the mobile terminal and said receivers are configured to transmit the at least one radio signal encrypted with a key that is agreed to, generated, stored, and/or with a key that is transmitted with agreed connection parameters.

21. A method of locating a mobile terminal, the method comprising:

setting up with the mobile terminal a connection to at least one first receiver of a plurality of receivers, while not setting up a connection with a further one of the plurality of receivers, at least for the given locating operation;

determining with each of the at least one first receiver and at least one of the further receivers a field strength of at least one radio signal transmitted by the mobile terminal or a first receiver; and locating the mobile terminal by way of the field strengths thus determined;

the at least one further receiver determines a field strength of at least one radio signal that is transmitted by the mobile terminal or a first receiver and is identified by the receivers as having been transmitted by the mobile terminal or a first receiver using a key and/or connection parameters; and the key or connection parameters are agreed when setting up a connection between the mobile terminal and the at least one first receiver and are determined by the further receivers by receiving the key or connection parameters when setting up a connection of the first receiver of the plurality of receivers.

22. The method according to claim 21, which comprises:

determining with each of the further ones of the receivers a field strength of at least one radio signal which is transmitted by the mobile terminal or a first receiver and is identified by the receivers as having been transmitted by the mobile terminal or a first receiver using a key and/or connection parameters;

wherein the key or connection parameters is/are agreed when or after setting up a connection between the mobile terminal and the at least one first receiver and is/are received by the further receivers from a control unit, which received said key/parameters from the first receiver.

* * * * *